June 15, 1926.

H. E. CURTIS

SHACKLE HANGER

Filed July 8, 1924

1,589,121

INVENTOR
Henry E. Curtis
BY John A. Naismith
ATTORNEY

Patented June 15, 1926.

1,589,121

UNITED STATES PATENT OFFICE.

HENRY E. CURTIS, OF SAN JOSE, CALIFORNIA, ASSIGNOR OF ONE-HALF TO JOHN H. BETTS, OF LONG BEACH, CALIFORNIA.

SHACKLE HANGER.

Application filed July 8, 1924. Serial No. 724,861.

It is one object of the invention to provide a shackle pivotally mounted upon a vehicle frame in such a manner as to permit swaying or rocking of the vehicle body without imparting a twisting movement to the said spring.

It is another object of the invention to provide an assembly of the character indicated in which the pivoted shackle is provided with a thrust bearing capable of withstanding any force to which it may be subjected.

It is still another object of the invention to provide a shackle assembly of the character indicated that provides great strength with a minimum amount of material and mechanical complication, economical to manufacture, and highly efficient in its practical application.

In the drawing:—

Figure 1:
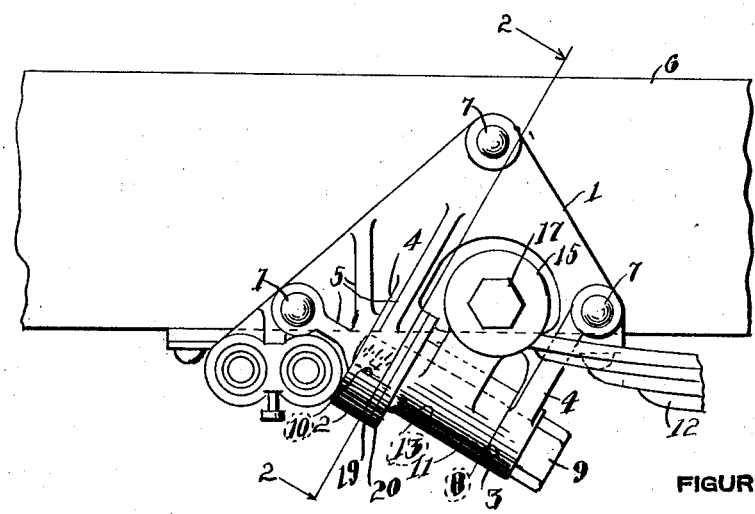
Figure 1 is a side elevation of the device in position on a vehicle frame.
Figure 2:
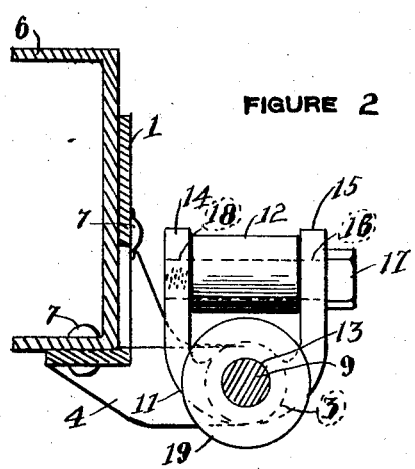
Figure 2 is a sectional view on line 2—2 of Figure 1.

Referring more particularly to the drawing, 1 indicates a plate of suitable conformation supporting bearing elements 2 and 3 by means of arms 4, the said elements being reinforced by ribs 5. Plate 1 is secured to the frame 6 of the vehicle by rivets 7.

Element 3 is reamed at 8 to receive bolt 9, and element 2 is tapped at 10 to receive the threaded end of bolt 9, this bolt forming a pivot upon which shackle 11 is mounted. Bolt 9 lies in the vertical plane bisecting spring 12 longitudinally.

The sleeve 11 is reamed at 13 to engage bolt 9 and is provided with spaced and parallel upstanding ears 14—15. The one ear 15 is reamed as at 16 to receive bolt 17 and ear 14 is tapped as at 18 to receive the threaded end of bolt 17, the said bolt 17 supporting one end of a spring 12, and is arranged at right angles to bolt 9.

Since a load upon frame 6 tends to flatten out the spring 12, the flattening of said spring exerts a pressure upon sleeve 11 which tends to move the same along bolt 9 toward bearing element 2. This force constantly applied to element 12, together with the almost constant swinging of sleeve 11 on bolt 9, would ordinarily rapidly wear the face of element 2 away. The face of element 2 is protected, therefore, by placing a wear ring 19 of case hardened steel on bolt 9 in contact with element 2, and forming a flange 20 on the end of sleeve 11 contacting therewith.

The result of this construction is, that the bolt 17 is maintained in its normal position relative to the spring during any and all movements of the vehicle body and consequently the contacting leaves of the spring 12 are subjected only to the normal smooth flat contact for which they are designed, thereby prolonging the useful life of the spring.

By arranging the bolt 9 in the vertical plane bisecting spring 12 longitudinally, and at an angle to a horizontal plane and directed downwardly toward spring 12 and below the mounting thereof on sleeve 11, it may be suitably supported by extensions from plate 1 without interfering with the free action of spring 12. The angle is such that the pressure of the flanged end of sleeve 11 is substantially uniform over the whole surface of wear ring 19 at all times Furthermore, by arranging the bolt 9 at an angle the wear is automatically taken up due to the tendency of the sleeve 11 to slide along bolt 9 when under a load instead of bearing squarely upon it By hanging the spring 12 above bolt 9 the so called underslung effect of the load is secured, and the center of gravity of the load is lowered thereby greatly increasing the stability of the structure.

It is to be understood, of course, that while I have herein shown and described one specific embodiment of the invention, changes in form, construction, and method of assembly and operation, may be made within the scope of the appended claim.

I claim:—

A shackle assembly comprising a plate mountable upon the side of a vehicle frame, a thrust receiving element carried thereby and having a face at right angles thereto and directed downwardly with respect to the normal horizontal plane of the frame when mounted thereon and tapped to receive a threaded bolt, an arm carried by said plate in parallel relation to said element, a bolt engaging said arm and element, a sleeve revolubly mounted on said bolt and carrying upstanding spaced arms, a bolt engaging said upstanding arms at right angles to said first mentioned bolt, and a spring mounted on said second mentioned bolt.

HENRY E. CURTIS.